(12) United States Patent
Guo

(10) Patent No.: US 9,708,935 B2
(45) Date of Patent: Jul. 18, 2017

(54) PARALLEL MOTION HEAT ENERGY POWER MACHINE AND WORKING METHOD THEREOF

(71) Applicant: Yuanjun Guo, Yongzhou (CN)

(72) Inventor: Yuanjun Guo, Yongzhou (CN)

(73) Assignee: Yuanjun Guo, Yongzhou (CN)

( * ) Notice: Subject to any disclaimer, the term of this patent is extended or adjusted under 35 U.S.C. 154(b) by 0 days.

(21) Appl. No.: 15/307,839

(22) PCT Filed: Sep. 23, 2014

(86) PCT No.: PCT/CN2014/087197
§ 371 (c)(1),
(2) Date: Oct. 31, 2016

(87) PCT Pub. No.: WO2015/165200
PCT Pub. Date: Nov. 5, 2015

(65) Prior Publication Data
US 2017/0058701 A1    Mar. 2, 2017

(30) Foreign Application Priority Data

Apr. 30, 2014    (CN) .......................... 2014 1 0177409

(51) Int. Cl.
*F03G 7/00*    (2006.01)
*F01K 3/02*    (2006.01)
(Continued)

(52) U.S. Cl.
CPC .............. *F01K 3/02* (2013.01); *F01B 11/004* (2013.01); *F01B 23/10* (2013.01); *F01B 29/12* (2013.01);
(Continued)

(58) Field of Classification Search
CPC ........ F01B 29/12; F03G 6/003; F01K 23/065; F01K 23/064; F01K 13/006; F01K 3/18; F01K 3/02
(Continued)

(56) References Cited

U.S. PATENT DOCUMENTS 5,896,746 A * 4/1999 Platell ................... F01K 23/065
                                                          60/618
6,945,044 B2 * 9/2005 Gimsa ................... F02G 1/0435
                                                          60/517

(Continued)

FOREIGN PATENT DOCUMENTS

CN          1550731 A      12/2004
CN        103912405 A       7/2014
(Continued)

*Primary Examiner* — Jason Shanske
(74) *Attorney, Agent, or Firm* — Gokalp Bayramoglu

(57) ABSTRACT

A parallel motion heat energy power machine and a working method thereof, includes a heat collector, an insulating pipe, a gasification reactor, an atomizer, a cylinder, a piston, a piston ring, an automatic exhaust valve, a cooler, a liquid storage tank, a pressure pump, a push-pull rod, an insulating layer, and a housing. The two cylinders are oppositely arranged on the housing in parallel. The piston is arranged inside the cylinder. The piston is provided with the piston ring. The pistons are arranged on both ends of the push-pull rod. The heat collector is connected to the gasification reactor through the insulating pipe. The atomizer is arranged on the air inlet end of the gasification reactor. The parallel motion heat energy power machine and working method thereof has a high heat-energy conversion efficiency. It is energy-saving, environmentally friendly, and less noisy.

10 Claims, 1 Drawing Sheet

(51) Int. Cl.
*F02G 1/044* (2006.01)
*F01B 29/12* (2006.01)
*F01B 31/08* (2006.01)
*F01B 31/28* (2006.01)
*F01K 3/18* (2006.01)
*F01K 13/00* (2006.01)
*F01K 23/06* (2006.01)
*F03G 6/00* (2006.01)
*F03G 7/04* (2006.01)
*F01B 23/10* (2006.01)
*F01B 11/00* (2006.01)
*F02B 63/04* (2006.01)
*F02B 71/04* (2006.01)

(52) U.S. Cl.
CPC .............. *F01B 31/08* (2013.01); *F01B 31/28* (2013.01); *F01K 3/18* (2013.01); *F01K 13/006* (2013.01); *F01K 23/064* (2013.01); *F01K 23/065* (2013.01); *F02B 63/041* (2013.01); *F02G 1/044* (2013.01); *F03G 6/003* (2013.01); *F03G 7/04* (2013.01); *F02B 71/04* (2013.01)

(58) Field of Classification Search
USPC ........................................................ 60/641.2
See application file for complete search history.

(56) References Cited

U.S. PATENT DOCUMENTS

2011/0289916 A1* 12/2011 Dion ..................... F02F 1/186
60/605.2
2014/0331656 A1* 11/2014 Nagar .................... F02B 75/28
60/297

FOREIGN PATENT DOCUMENTS

| CN | 203892053 U | 10/2014 |
| DE | 19860522 C1 | 4/2000 |
| DE | 10248785 A1 | 5/2004 |
| DE | 102009030173 A1 | 12/2010 |
| JP | H09184664 A | 7/1997 |

* cited by examiner

PARALLEL MOTION HEAT ENERGY POWER MACHINE AND WORKING METHOD THEREOF

CROSS REFERENCE TO RELATED APPLICATIONS

This application is the national phase entry of International Application No. PCT/CN2014/087197, filed on Sep. 23, 2014, which is based upon and claims priority to CN 201410177409.0, filed on Apr. 30, 2014, the entire contents of which are incorporated herein by reference.

TECHNICAL FIELD

The invention relates to the field of thermal energy power equipment, especially the power machine which can convert heat energy from the solar energy, the geothermal, the high-temperature gas generated by burning of combustibles, the thermal energy or the exhaust gas of internal combustion engine, and the high-temperature gas discharged from factory into the kinetic energy.

BACKGROUND

Conventional power equipment includes the steam engines, internal combustion engines, and external combustion engines.

Steam engine: It cannot work without the boiler. The whole machine is heavy and large. The pressure and the temperature of the new steam cannot be too high, and the exhaust pressure cannot be too low. The heat efficiency is hard to improve. It is a reciprocating machine. The inertia restrains the improvement of the rotational speed. The working is not continuous. The flow of steam is restrained, which limits the improvement of the power.

Internal combustion engine: It has a complicated structure, a high requirement of fuel, and strict requirement of the cleanliness of fuel. It pollutes the environment.

External combustion engine: For example, Stirling engine is one kind of external combustion engine. Compared with internal combustion engine, Stirling engine has the following advantages:

It is suitable for all kinds of energy, not matter what state the energy is derived from, liquid, gas, or solid fuel. When using the heat-carrying system (e.g., heat pipe) to heat indirectly, almost all high-temperature heat source (e.g., solar radioactive isotope and nuclear reaction) can be used, while the engine itself (except the heater) does not need any change. At the same time, Stirling engine does not need a compressing machine to increase the pressure, which can be met by an ordinary fan. The fuel with relatively high impurity content is allowed. The unit capacity of Stirling engine is small, the capacity of which ranges from 20 to 50 kw. The system capacity can be increased or reduced according to local conditions. The structure is simple. The number of parts of the external combustion engine is 40% less than that of an internal combustion engine. It has a significant margin of price discount and a low maintenance cost.

When Stirling engine is running, the fuel is burning continuously in the combustion chamber which is outside the cylinder. The working medium, which is independent from the gas, absorbs the heat from the heater and works to the outside environment according to the Stirling cycle. Thus, the engine knocking and intermittent combustion of the internal combustion engine and the like are avoided. An efficient, less noisy, and low-exhaust operation is realized.

As being efficient, the total energy efficiency reaches more than 80%. As being less noisy, the noise at a place which is one meter from the bare machine is lower than 68 dBA. As being low-exhaust, the emission of tail gas meets the standard of Euro 5.

Since the working medium does not burn, the external combustion engine avoids the problem of knocking of the conventional internal combustion engine, such that high efficiency, low-noise, low-polluting, and low-running-costs are realized. The external combustion engine can burn various gases, such as natural gas, biogas, petroleum gas, hydrogen, gas, etc. Liquid fuels like diesel, liquefied petroleum gas, etc. can also be used. Burning woods, the solar energy, etc. can also be used. As long as the temperature of the hot chamber reaches 700° C., the equipment will run and work. Lower the environmental temperature, the higher will be the efficiency of the power generation. The most remarkable advantage of the external combustion engine is that the output and efficiency are not affected by the altitude, which makes it very suitable for using in high-altitude areas.

Meanwhile, the mainly existing problems and defects of Stirling engine are as follows: the manufacturing cost is high; the working medium sealing technology is difficult the reliability and serving life of the sealing part have problems; the material cost is high; the power adjusting control system is complex; the machine is heavy; the costs of the expansion chamber, the compression chamber, the heater, the cooling chamber, the regenerator, etc. are high; and the heat loss is twice to three times than that of an internal combustion engine.

Organic Rankine Cycle system includes a pump, an evaporator, an expander, a generator, a condenser, etc. The heat collector absorbs the solar radiation. The temperature of the heat exchanging medium inside the heat collector increases. The heat is transmitted to the organic working medium from the heat exchanging medium through the evaporator. The organic working medium is heated in the evaporator under a constant pressure. The gaseous organic working medium with a high pressure enters the expander to work through expanding, so as to drive the generator to generate power. The organic working medium discharged from the tail of the expander enters the condenser to condense under a constant pressure. After increasing the pressure by the pump, the organic working medium output from the condenser enters the evaporator, such that one power generation cycle is completed.

Organic Rankine Cycle system has the following defects. The conversion efficiency is low. The size is huge. The expander which has a complex structure is essential to work.

SUMMARY OF THE INVENTION

The invention overcomes the existing problems that the costs of the expansion chamber, the compression chamber, the heater, the cooling chamber, the regenerator, etc. are high; and the heat loss is twice to three times than that of an internal combustion engine. The invention overcomes the technical problem that Organic Rankine Cycle system needs an expander or a steam turbine, which renders a high manufacturing cost. The invention provides a parallel motion heat energy power machine that is a heat power machine which combines the advantages of Stirling engine and Organic Rankine Cycle system. After heat is absorbed by the heat collector, the gasification reactor is heated, to make the working medium gasify and expand under a high temperature to push the piston to generate the kinetic energy to work.

The invention provides a heat energy power machine which has a high heat conversion efficiency, in which the working medium is recycled, the output power within the maximum power range is adjustable by adjusting the amount of the working medium, the output power is adjustable by adjusting the temperature, and the machine output power is stable.

The technical solution of the invention is: a parallel motion heat energy power machine, characterized in that, comprising a heat collector, an insulating pipe, a gasification reactor, an atomizer, a cylinder, a piston, a piston ring, an automatic exhaust valve, a cooler, a liquid storage tank, a pressure pump, a push-pull rod, an insulating layer, and a housing. The two cylinders are oppositely arranged on the housing in parallel. The piston is arranged inside the cylinder. The piston is provided with the piston ring. The pistons are arranged on both ends of the push-pull rod. The heat collector is connected to the gasification reactor through the insulating pipe. The atomizer is arranged on the air inlet end of the gasification reactor. The atomizer is connected to the pressure pump through the pipe. The pressure pump is connected to the liquid storage tank through the pipe. The gasification reactor is arranged on the top dead center of the cylinder. The automatic exhaust valve is arranged on the bottom dead center of the cylinder. The automatic exhaust valve is connected to the cooler through the pipe. The cooler is connected to the liquid storage tank through the pipe. The outer layer of the housing is provided with the insulating layer.

Furthermore, the heat collector absorbs the solar energy, the geothermal energy, the high-temperature gas generated by burning the combustible, the exhaust gas of an internal combustion engine, the high-temperature gas discharged from a factory, or other heat energy.

Furthermore, the gasification reactor includes a pressure vessel, a gasification conducting strip, a gas hole, and an atomizer. The gasification conducting strips are arranged on the pressure vessels. The gas holes are arrayed on the gasification conducting strip. The atomizer is arranged on the air inlet end of the pressure vessel.

Furthermore, the pressure pump is connected to the push-pull rod. The pressure pump opens and closes once whenever the circulation is completed.

Furthermore, the push-pull rod is provided with a transmission shaft, which connects to the rotor of a generator to cut magnetic induction lines to form a parallel motion heat energy power machine power generation apparatus.

A work method of the above parallel motion heat energy power machine is: the heat collector absorbs the solar energy, the geothermal energy, the high-temperature gas generated by burning a combustible, the heat energy or exhaust gas of an internal combustion engine, the high-temperature gas discharged from a factory, or other heat energy. The heat is transmitted to the gasification reactor directly or via the pipe. The pipe is provided with flowing heat conducting medium. The liquid working medium is injected through the pressure pumps into the gasification reactor to be atomized. The atomized working medium is gasified and expanded by the gasification reactor. When the piston reaches the bottom dead center of the cylinder, the working gas is discharged from the automatic exhaust valve. The discharged gaseous working medium is cooled down by the cooler. Meanwhile, the other piston reaches the top dead center of the cylinder. The pressure pump of the cylinder opens, such that the liquid working medium is injected through the atomizers into the gasification reactor to be gasified and expanded to push the piston to work. The pressure pumps open and close in turns. The pistons inside two cylinders take turns to work. The kinetic energy is output by the push-pull rod.

The advantages of the invention is: 1. the working medium can be repeatedly used without pollution; 2. the heat energy conversion efficiency is 65%-98%; 3. the output power can be adjusted by adjusting the capacity and number of the machine cylinder according to desired power; 4, the output power can be adjusted within the maximum power range by adjusting the injecting liquid; 5. the machine works by gasifying the working medium, which does not generate knocking during the whole process; 6. the machine has a simple structure, low manufacturing cost, and uses the automatic exhaust function to reduce energy loss; 7. the working power of the present invention is twice than that of the single cylinder; 8. conventional energy consumption can be replaced, which is economic, energy-saving, environment friendly, and less noisy.

In figures: 1 is a heat collector; 2 is an insulating pipe; 3 is a gasification reactor; 4 is an atomizer; 5 is a cylinder; 6 is a piston; 7 is a piston ring; 8 is an automatic exhaust valve; 9 is a cooler; 10 is a liquid storage tank; 11 is a pressure pump; 12 is a push-pull rod; 13 is an insulating layer; 14 is a housing; 15 is a pressure vessel; 16 is it gasification conducting strip; 17 is a gas hole.

DETAILED DESCRIPTION OF THE EMBODIMENT

Figure 1:
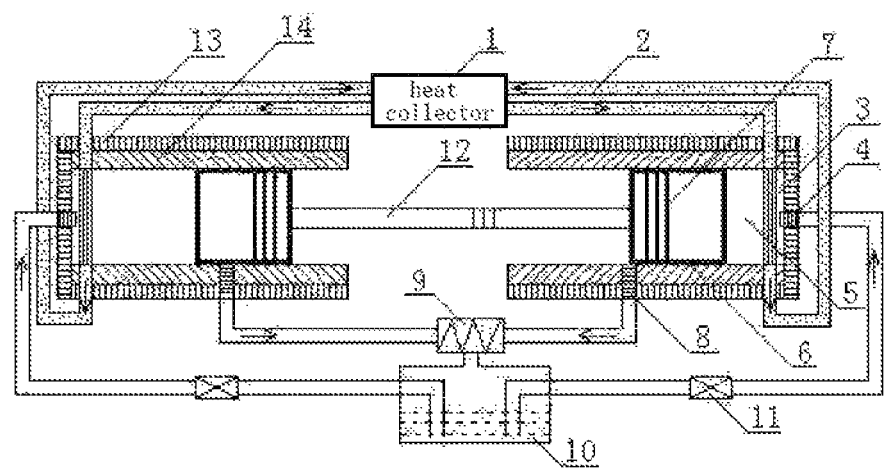
FIG. 1 is the structural schematic diagram of the invention.
Figure 2:
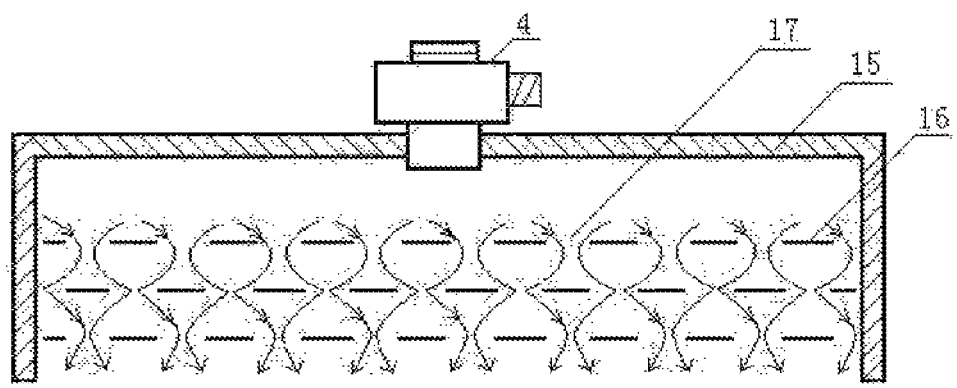
FIG. 2 is the structural diagram of the gasification reactor of the invention.

Referring to FIGS. 1-2, the embodiments of the invention are as follows:

Embodiment 1

A parallel motion heat energy power machine includes a heat collector 1, insulating pipes 2. gasification reactors 3, atomizers 4, cylinders 5, pistons 6, piston rings 7, automatic exhaust valves 8, cooler 9, liquid storage tank 10, pressure pumps 11, push-pull rod 12, insulating layer 13, and a housing 14. Two cylinders 5 are oppositely arranged on housing 14 in parallel Piston 6 is arranged inside cylinders 5. Piston 6 is provided with piston rings 7. Pistons 6 are arranged on both ends of push-pull rod 12. Heat collector 1 is connected to gasification reactor 3 through insulating pipe 2. Atomizer 4 is arranged on the air inlet end of gasification reactors 3. Atomizer 4 is connected to pressure pumps 11 through the pipes. Pressure pump 11 is connected to liquid storage tank 10 through the pipes. Gasification reactor 3 is arranged on the top dead center of cylinder 5. Automatic exhaust valve 8 is arranged on the bottom dead center of cylinder 5. Automatic exhaust valve 8 is connected to cooler 9 through the pipes. Cooler 9 is connected to liquid storage tank 10 through the pipes. The outer layer of the housing 14 is provided with insulating layer 13.

Embodiment 2

The parallel motion heat energy power machine as described in Embodiment 1, the gasification reactor includes pressure vessel 15, gasification conducting strip 16, gas hole 17, atomizer 4. Gasification conducting strip 16 is arranged on pressure vessel 15. Gas hole 17 is arrayed on gasification conducting strip 16. Atomizer 4 is arranged on the air inlet end of pressure vessel 15. Pressure pump 11 is associated with push-pull rod 12. pressure pump 11 opens and closes once whenever the circulation is completed. Push-pull rod 12 is provided with a transmission shaft, which connects to the rotator of the generator to cut the magnetic induction lines. Cooler 9 uses the natural water cooling method or the condenser.

What is claimed is:

1. A parallel motion heat energy power machine, comprising a heat collector, two insulating pipes, two gasification reactors, two atomizers, two cylinders, two pistons, at least one piston ring, two automatic exhaust valves, a cooler, a liquid storage tank, two pressure pumps, a push-pull rod, an insulating layer, and a housing;
    wherein the two cylinders are oppositely arranged on the housing in parallel;
    wherein the two pistons are arranged inside the two cylinders respectively;
    wherein the each piston is provided with at least one of the at least one piston ring;
    wherein the two pistons are arranged on both ends of the push-pull rod respectively;
    wherein the heat collector is connected to the two gasification reactors through the two insulating pipes respectively;
    wherein the two atomizers are arranged on air inlet ends of the two gasification reactors respectively;
    wherein the two atomizers are connected to the two pressure pumps respectively;
    wherein the two pressure pumps are both connected to the liquid storage tank;
    wherein the two gasification reactors are arranged on top dead centers of the two cylinders respectively;
    wherein the two automatic exhaust valves are arranged on bottom dead centers of the two cylinders respectively;
    wherein the two automatic exhaust valves are both connected to the cooler;
    wherein the cooler is connected to the liquid storage tank; and
    wherein an outer layer of the housing is provided with the insulating layer.

2. The parallel motion heat energy power machine according to claim 1, wherein the heat collector can absorb solar energy, geothermal energy, high-temperature gas generated by burning of a combustible, exhaust gas of an internal combustion engine, or high-temperature gas discharged from a factory.

3. The parallel motion heat energy power machine according to claim 1, wherein each gasification reactor includes a pressure vessel, a gasification conducting strip, and a plurality of gas holes;
    wherein each of the gasification conducting strips is arranged on a respective pressure vessel;
    wherein the plurality of gas holes are arrayed on each of the gasification conducting strips; and
    wherein one of the atomizers is arranged on an air inlet end of each of the pressure vessels.

4. The parallel motion heat energy power machine according to claim 1, wherein the pressure pumps are associated with the push-pull rod; wherein each pressure pump opens and closes once whenever a circulation is completed.

5. The parallel motion heat energy power machine according to claim 1, wherein the push-pull rod is provided with a transmission shaft, which connects to a rotor of a generator to cut magnetic induction lines.

6. A method of using the parallel motion heat energy power machine according to claim 1, comprising:
    absorbing, by the heat collector, solar energy, geothermal energy, high-temperature gas generated by burning a combustible, heat energy or exhaust gas of an internal combustion engine, or high-temperature gas discharged from a factory;
    transmitting heat to the gasification reactors directly or via a the insulating pipes, wherein the insulating pipes are provided with a flowing heat conducting medium;
    injecting, through the pressure pumps, a liquid working medium into the gasification reactors to be atomized;
    gasifying and expanding, by the gasification reactors, the atomized working medium;
    discharging working gas from the automatic exhaust valves when one of the pistons reaches a bottom dead center of the respective cylinder;
    cooling the discharged gaseous working medium by the cooler;
    wherein, when the other piston reaches a top dead center of the other cylinder, the respective pressure pump for the other cylinder opens, the liquid working medium is injected into the respective gasification reactor through the respective atomizer so as to gasify and expand to push the other piston to work;
    wherein the two pressure pumps open and close in turns;
    wherein the two pistons inside the two cylinders take turns to work; and
    wherein kinetic energy is output by the push-pull rod.

7. A method of using the parallel motion heat energy power machine according to claim 2, comprising:
    absorbing, by the heat collector, solar energy, geothermal energy, high-temperature gas generated by burning a combustible, heat energy or exhaust gas of an internal combustion engine, or high-temperature gas discharged from a factory;
    transmitting heat to the gasification reactors directly or via a the insulating pipes, wherein the insulating pipes are provided with a flowing heat conducting medium;
    injecting, through the pressure pumps, a liquid working medium into the gasification reactors to be atomized;
    gasifying and expanding, by the gasification reactors, the atomized working medium;
    discharging working gas from the automatic exhaust valves when one of the pistons reaches a bottom dead center of the respective cylinder;
    cooling the discharged gaseous working medium by the cooler;
    wherein, when the other piston reaches a top dead center of the other cylinder, the respective pressure pump for the other cylinder opens, the liquid working medium is injected into the respective gasification reactor through the respective atomizer so as to gasify and expand to push the other piston to work;
    wherein the two pressure pumps open and close in turns;
    wherein the two pistons inside the two cylinders take turns to work; and
    wherein kinetic energy is output by the push-pull rod.

8. A method of using the parallel motion heat energy power machine according to claim 3, comprising:
    absorbing, by the heat collector, solar energy, geothermal energy, high-temperature gas generated by burning a combustible, heat energy or exhaust gas of an internal combustion engine, or high-temperature gas discharged from a factory;
    transmitting heat to the gasification reactors directly or via a the insulating pipes, wherein the insulating pipes are provided with a flowing heat conducting medium;

injecting, through the pressure pumps, a liquid working medium into the gasification reactors to be atomized;

gasifying and expanding, by the gasification reactors, the atomized working medium;

discharging working gas from the automatic exhaust valves when one of the pistons reaches a bottom dead center of the respective cylinder;

cooling the discharged gaseous working medium by the cooler;

wherein, when the other piston reaches a top dead center of the other cylinder, the respective pressure pump for the other cylinder opens, the liquid working medium is injected into the respective gasification reactor through the respective atomizer so as to gasify and expand to push the other piston to work;

wherein the two pressure pumps open and close in turns;

wherein the two pistons inside the two cylinders take turns to work; and wherein kinetic energy is output by the push-pull rod.

9. A method of using the parallel motion heat energy power machine according to claim 4, comprising:

absorbing, by the heat collector, solar energy, geothermal energy, high-temperature gas generated by burning a combustible, heat energy or exhaust gas of an internal combustion engine, or high-temperature gas discharged from a factory;

transmitting heat to the gasification reactors directly or via a the insulating pipes, wherein the insulating pipes are provided with a flowing heat conducting medium;

injecting, through the pressure pumps, a liquid working medium into the gasification reactors to be atomized;

gasifying and expanding, by the gasification reactors, the atomized working medium;

discharging working gas from the automatic exhaust valves when one of the pistons reaches a bottom dead center of the respective cylinder;

cooling the discharged gaseous working medium by the cooler;

wherein, when the other piston reaches a top dead center of the other cylinder, the respective pressure pump for the other cylinder opens, the liquid working medium is injected into the respective gasification reactor through the respective atomizer so as to gasify and expand to push the other piston to work;

wherein the two pressure pumps open and close in turns;

wherein the two pistons inside the two cylinders take turns to work; and wherein kinetic energy is output by the push-pull rod.

10. A method of using the parallel motion heat energy power machine according to claim 5, comprising:

absorbing, by the heat collector, solar energy, geothermal energy, high-temperature gas generated by burning a combustible, heat energy or exhaust gas of an internal combustion engine, or high-temperature gas discharged from a factory;

transmitting heat to the gasification reactors directly or via a the insulating pipes, wherein the insulating pipes are provided with a flowing heat conducting medium;

injecting, through the pressure pumps, a liquid working medium into the gasification reactors to be atomized;

gasifying and expanding, by the gasification reactors, the atomized working medium;

discharging working gas from the automatic exhaust valves when one of the pistons reaches a bottom dead center of the respective cylinder;

cooling the discharged gaseous working medium by the cooler;

wherein, when the other piston reaches a top dead center of the other cylinder, the respective pressure pump for the other cylinder opens, the liquid working medium is injected into the respective gasification reactor through the respective atomizer so as to gasify and expand to push the other piston to work;

wherein the two pressure pumps open and close in turns;

wherein the two pistons inside the two cylinders take turns to work; and wherein kinetic energy is output by the push-pull rod.

\* \* \* \* \*